(12) United States Patent
Li et al.

(10) Patent No.: US 7,093,626 B2
(45) Date of Patent: Aug. 22, 2006

(54) MOBILE HYDROGEN DELIVERY SYSTEM

(75) Inventors: Yang Li, Troy, MI (US); Charles Stahl, Algonac, MI (US); Ned Stetson, Lake Orion, MI (US); Daniel Bovinich, Rochester Hills, MI (US)

(73) Assignee: Ovonic Hydrogen Systems, LLC, Rochester Hills, MI (US)

( * ) Notice: Subject to any disclaimer, the term of this patent is extended or adjusted under 35 U.S.C. 154(b) by 137 days.

(21) Appl. No.: 11/005,582

(22) Filed: Dec. 6, 2004

(65) Prior Publication Data

US 2006/0118201 A1    Jun. 8, 2006

(51) Int. Cl.
*B65B 1/04*        (2006.01)
(52) U.S. Cl. ......................................... 141/231; 141/18
(58) Field of Classification Search .................... 141/2, 141/18, 83, 94, 98, 231; 62/46.2; 48/197 R
See application file for complete search history.

(56) References Cited

U.S. PATENT DOCUMENTS

| 4,211,537 A | * | 7/1980 | Teitel ........................... 48/191 |
| 6,886,609 B1 | * | 5/2005 | Cohen et al. ................ 141/231 |
| 7,036,324 B1 | * | 5/2006 | Bradley et al. .............. 62/46.1 |

* cited by examiner

*Primary Examiner*—Steven O. Douglas
(74) *Attorney, Agent, or Firm*—David W. Schumaker; Marvin S. Siskind

(57) ABSTRACT

A mobile hydrogen delivery system for delivering a compressed stream of hydrogen at pressures up to 15000 psig. The mobile hydrogen delivery system includes a hydrogen compression system, a gaseous hydrogen storage system, and a delivery system for supplying hydrogen to end users. A mobile platform supports the hydrogen compression system, the gaseous hydrogen storage system, and the dispensing system. The mobile platform may be any platform, such as a trailer, capable of being pulled, pushed, or supported by any type of vehicle, such a truck, train, boat, tractor, etc.

13 Claims, 3 Drawing Sheets

MOBILE HYDROGEN DELIVERY SYSTEM

The U.S. Government has a paid-up license in this invention and the right in limited circumstances to require the patent owner to license others on reasonable terms as provided for by the terms of contract No. DAAE07-03-C-L126 awarded by The Department of Defense.

FIELD OF THE INVENTION

The present invention relates generally to a mobile hydrogen delivery system designed to dispense hydrogen to stationary or mobile hydrogen consuming applications.

BACKGROUND

As the world's population expands and its economy increases, the use of fossil fuels is becoming more and more prevalent in both developed and developing nations. With the supply of fossil fuels being limited, the cost of fossil fuels look to increase dramatically over the coming years. Besides being in limited supply, fossil fuels also are a leading cause pollution and are a major contributor to global warming.

Due to the problems associated with fossil fuels, considerable attention is being directed at finding alternatives to fossil fuels. An alternative fuel that has great potential as a viable replacement for fossil fuels is hydrogen. While the world's oil reserves are being rapidly depleted, the supply of hydrogen remains virtually unlimited. Hydrogen may be produced from coal, natural gas and other hydrocarbons, or formed by the electrolysis of water. Moreover hydrogen may be produced without the use of fossil fuels via electrolysis of water powered by nuclear, hydroelectric, geothermal, wind, or solar energy. Hydrogen has the highest density of energy per unit weight of any chemical fuel and is essentially non-polluting since the main by-product of burning hydrogen is water. Hydrogen is the most plentiful element in the universe. Hydrogen may provide an inexhaustible, clean source of energy for our planet which may be produced by various processes.

Hydrogen is currently being used to power fuel cells and hydrogen internal combustion engines. Fuel cells or hydrogen internal combustion engines may be used in mobile applications, such as powering a vehicle, or in stationary applications, such as power generators.

To propel hydrogen to the forefront as a viable replacement for fossil fuels, hydrogen must be in a readily available supply to hydrogen consuming applications. To make hydrogen readily available, a hydrogen infrastructure allowing for the convenient distribution of hydrogen to end users is essential. Described in U.S. Pat. No. 6,305,442, entitled "A Hydrogen-based Ecosystem" filed on Nov. 22, 1999 for Ovshinsky, et al., is a complete hydrogen infrastructure system for the generation, storage, transportation, and distribution of hydrogen. While U.S. Pat. No. 6,305,442 provides for a complete hydrogen infrastructure, there is still room for improvements to further develop many aspects of the hydrogen infrastructure. One such aspect is in the area of mobile hydrogen generation and supply systems. Described in U.S. Pat. No. 6,745,801, entitled "Mobile Hydrogen Generation And Supply System" is a mobile hydrogen generation and supply system which generates hydrogen or a hydrogen-containing intermediate from one or more hydrogen precursors and offloads the hydrogen or hydrogen-containing intermediate to hydrogen receiving facility. While the mobile supply system provides hydrogen to a receiving facility, the system does not provide for the distribution of hydrogen to end users such as vehicles. While hydrogen infrastructures and hydrogen delivery systems have been developed there is still a need for improvements which may further improve the availability of hydrogen to end users such as vehicles and other hydrogen consuming applications.

SUMMARY OF THE INVENTION

Disclosed herein, is a mobile hydrogen delivery system including a metal hydride hydrogen compressor, a mechanical hydrogen compressor, a gaseous hydrogen storage system, a hydrogen dispensing system, and a mobile platform for supporting the metal hydride storage system, the mechanical hydrogen compressor, the gaseous hydrogen storage system, and the hydrogen dispensing system.

The metal hydride hydrogen compressor stores hydrogen and provides a low pressure stream of hydrogen at pressures up to 2000 psig. The metal hydride hydrogen compressor may provide for single stage or multi-stage compression of hydrogen. The mechanical hydrogen compressor receives the low pressure stream of hydrogen from the metal hydride hydrogen compressor and provides a high pressure stream of hydrogen at pressures up to 15000 psig.

The gaseous hydrogen storage system may include one or more pressure containment vessels. The pressure containment vessels receive and store the high pressure stream of hydrogen in compressed gaseous form.

The hydrogen dispensing system dispenses the low pressure stream of hydrogen from the metal hydride storage system and the high pressure stream of hydrogen from the gaseous hydrogen storage system to end users. When the one or more pressure containment vessels comprise two or more pressure containment vessels, the hydrogen dispensing system may dispense hydrogen from the two or more pressure containment vessels to the end user in a cascading manner.

The mobile hydrogen delivery system may further comprise a hydrogen generator for generating and supplying hydrogen to the metal hydride hydrogen compressor. The hydrogen generator may be one or more selected from a hydrogen reformer, a chemical hydride reactor, and an electrolyzer. The electrolyzer may powered by a solar generator which may include one or more triple junction amorphous silicon solar cells. The chemical hydride reactor reacts a water reactive chemical hydride with water to produce gaseous hydrogen. The chemical hydride may be selected from alkali metal hydrides, alkali metal borohydrides, alkaline earth metal hydrides, alkaline earth metal borohydrides, and combinations thereof.

The mobile hydrogen delivery system may also include a fuel cell and/or a hydrogen powered generator in gaseous communication with the hydrogen dispensing system.

DETAILED DESCRIPTION OF THE PREFERRED EMBODIMENTS OF THE INVENTION

Disclosed herein, is a mobile hydrogen delivery system for delivering a compressed stream of gaseous hydrogen at pressures up to 15000 psig. The mobile hydrogen delivery system receives hydrogen from an onboard or offboard hydrogen supply, compresses and stores the hydrogen at pressures up to 15000 psig, and dispenses the compressed hydrogen to end users.

Figure 1:
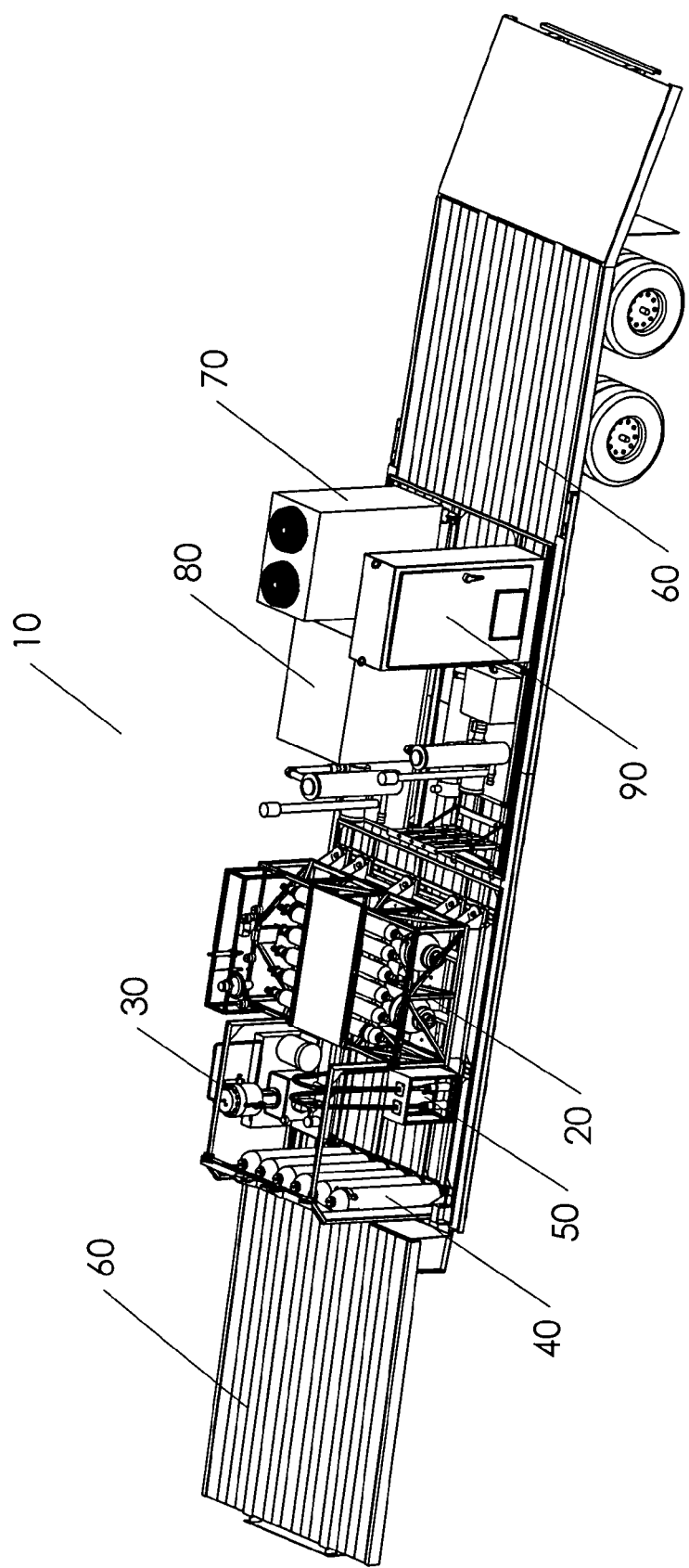
FIG. 1, is a depiction of a preferred embodiment of the mobile hydrogen delivery system.
Figure 2:
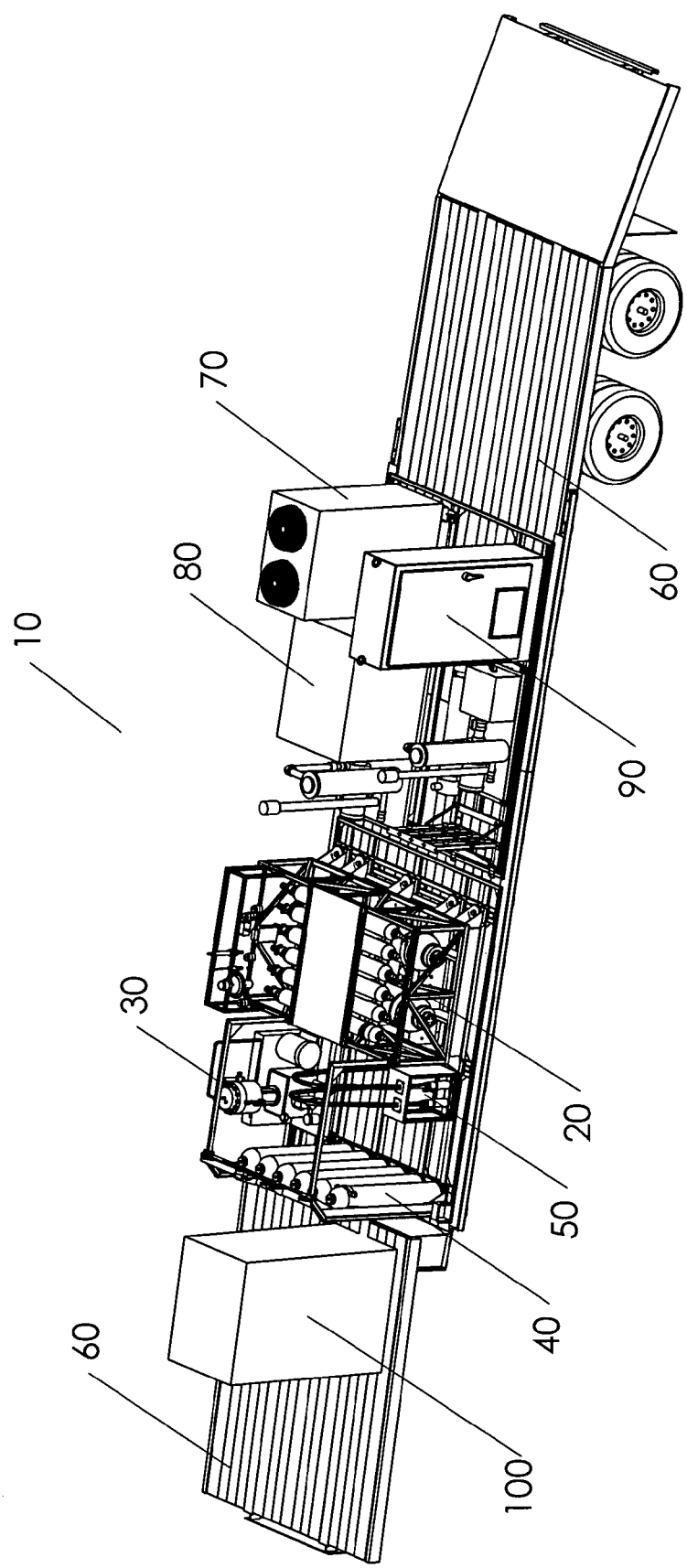
FIG. 2, is a depiction of an alternative embodiment of the mobile hydrogen delivery system including a hydrogen generator.

In a preferred embodiment of the present invention, as shown in FIG. 1, the mobile hydrogen delivery system 10 generally comprises a metal hydride hydrogen compressor 20 for storing hydrogen and providing a low pressure stream of hydrogen having a pressure up to 2000 psig, a mechanical hydrogen compressor 30 for receiving the low pressure stream of hydrogen and providing a high pressure stream of hydrogen at a pressure up to 15000 psig, a gaseous hydrogen storage system 40 for storing the high pressure stream of hydrogen at a pressure up to 15000 psig, a hydrogen dispensing system 50 for dispensing the low pressure hydrogen stream from the metal hydride hydrogen storage unit and the high pressure stream from the gaseous hydrogen storage system to end users, and a mobile platform 60 for supporting the metal hydride hydrogen compressor, the mechanical compressor, the gaseous hydrogen storage system, and the hydrogen dispensing system. The mobile platform 60 may be any platform, open or enclosed, such as a trailer, capable of being pulled, pushed, or supported by any type of vehicle, such a truck, train, boat, tractor, etc. The mobile hydrogen delivery system 10 may include a chiller 70 and a heater 80 for heating and cooling a heat transfer fluid utilized in the metal hydride hydrogen compressor 20. The mobile hydrogen delivery system 10 may also include a control system 90 for controlling operating conditions within the system.

For the purposes of the present invention end users are defined as vehicles, generators, and other types of machinery or systems which utilize hydrogen as a fuel and dispensing is defined as the delivering of hydrogen to end users. The end users may have an onboard hydrogen receiving vessel for receiving hydrogen from the mobile hydrogen delivery system. The onboard hydrogen receiving vessel stores the hydrogen until the hydrogen is consumed by the end user during operation.

The metal hydride hydrogen compressor 20 receives hydrogen gas from an onboard or offboard source of gaseous hydrogen, stores the hydrogen in metal hydride form, and provides a supply of compressed hydrogen gas at a pressure up to 2000 psig. By utilizing a metal hydride hydrogen compressor in conjunction with the mechanical hydrogen compressor, the metal hydride hydrogen compressor provides not only onboard hydrogen storage capabilities and the capability of delivering a stream of hydrogen gas at a pressure up to 2000 psig without using the mechanical compressor, but also reduces the power requirement needed to by the mechanical hydrogen compressor to produce a high pressure stream of gaseous hydrogen at a pressure up to 15000 psig.

The metal hydride hydrogen compressor 20 includes one or more pressure containment vessels at least partially filled with a hydrogen storage alloy. The pressure containment vessels may be constructed from aluminum or stainless steel. Heat fins, heaters, cooling jackets, or heat exchanger tubing may be placed in thermal contact with the hydrogen storage alloy or the pressure containment vessel to aid in the transfer of heat to and from the hydrogen storage alloy. The hydrogen storage alloy utilized in the metal hydride hydrogen compressor may be selected from AB, $A_2B$, $AB_2$ and $AB_5$ alloys, such as rare earth-nickel alloys, titanium-manganese alloys, titanium-zirconium alloys, titanium-iron alloys, magnesium-nickel alloys, magnesium alloys, and the like.

The metal hydride hydrogen compressor 20 may be a single stage or multi stage compressor capable of delivering a compressed stream of hydrogen at pressures up to 2000 psig. Single stage metal hydride hydrogen compressors utilize a single hydrogen storage alloy capable of absorbing hydrogen at low temperatures and pressures and desorbing hydrogen at high pressures upon being heated to a higher temperature. Multi-stage metal hydride compressors utilize two or more hydrogen storage alloys contained in separate hydrogen storage alloy beds, each hydrogen storage alloy having different plateau pressures. In multistaged metal hydride compressors, hydrogen is cascaded through the beds as the beds are cycled between a high and low temperature to produce a compressed hydrogen stream. Examples of single and multi-stage metal hydride compressors are described in detail in U.S. Pat. Nos. 4,085,590; 4,402,187; 4,505,120; 4,995,235, and 6,591,616.

Metal hydride hydrogen compressors utilize the reversible reaction that makes hydrogen storage alloys practical hydrogen storage materials. The reaction is written as:

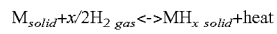

$$M_{solid} + x/2 H_{2\,gas} \leftrightarrow MH_{x\,solid} + \text{heat}$$

where M is the metal hydride forming hydrogen storage alloy, $MH_x$ is the metal hydride, and the heat is the enthalpy of the reaction. The reaction equilibrium is affected by hydrogen gas pressure and temperature. An increase in the overpressure of hydrogen favors the formation of the hydride phase (charging) and a decrease in the hydrogen overpressure favors the disproportionation of the hydride phase (discharging). Since the forward (charging) reaction is exothermic, where heat is liberated, and since the reverse (discharging) reaction is endothermic, where heat is absorbed, an increase in temperature favors the disproportionation of the hydride phase and a decrease in temperature favors the formation of the hydride phase. Being that the reaction equilibrium is affected by hydrogen pressure and temperature, it is therefore possible to absorb hydrogen at low temperatures and pressures and then heat the metal hydride to a higher temperature and release the stored hydrogen at a higher pressure.

The mechanical hydrogen compressor 30 may be any type of a single or multi-staged mechanical gas compressor which is capable of providing a compressed stream of hydrogen at pressures up to 15000 psig. Such compressors may be reciprocating compressors, rotary screw compressors, centrifugal compressors, or other compressors well known in the art.

The gaseous hydrogen storage system 40 receives and stores compressed gaseous hydrogen supplied from the mechanical hydrogen compressor. The gaseous hydrogen storage system 40 includes one or more hydrogen supply vessels in gaseous communication with the mechanical hydrogen compressor. The hydrogen supply vessels may be any type of pressure containment vessels able to receive and store gaseous hydrogen at pressures up to 15000 psig. During operation, the high pressure stream of hydrogen produced by the mechanical hydrogen compressor is received and stored in gaseous form in the one or more hydrogen supply vessels until dispensed by the hydrogen dispensing system to end users. When the hydrogen is dispensed to and received by the end users, the hydrogen may be consumed or stored in a hydrogen receiving vessel. When utilizing one hydrogen supply vessel in the gaseous hydrogen storage system, hydrogen is supplied from the hydrogen supply tank to the hydrogen receiving vessel of the end user until the pressure inside the hydrogen receiving vessel equals the pressure inside the hydrogen supply vessel. Where more than one hydrogen supply vessel is utilized, hydrogen is supplied from the hydrogen supply vessels to the hydrogen receiving vessel of the end user such that hydrogen is supplied from the hydrogen supply vessels in a cascading manner via the hydrogen dispensing system to the hydrogen receiving vessel. When hydrogen is supplied from the gaseous hydrogen storage system in a cascading manner, hydrogen is first supplied from one of the hydrogen supply vessels to the hydrogen receiving vessel. Once the pressure in the hydrogen receiving vessel equals the pressure in the hydrogen supply vessel, hydrogen from a second hydrogen supply vessel is supplied to the hydrogen receiving vessel. The cascading process continues with additional pressure containment vessels until the hydrogen receiving vessel is filled at the desired pressure.

The hydrogen dispensing system 50 delivers compressed hydrogen from the gaseous hydrogen storage system to end users at pressures up to 15000 psig. The hydrogen dispensing system 50 has an input from the gaseous hydrogen storage system and may also have an input directly from the metal hydride hydrogen compressor. Preferably, the dispenser supplies compressed hydrogen directly from the metal hydride hydrogen compressor instead of the gaseous hydrogen storage system when supplying hydrogen at pressures up to 2000 psig, so the hydrogen stored in the gaseous hydrogen storage system may be later used when a supply of hydrogen at pressures exceeding 2000 psig is required.

The hydrogen dispensing system 50 generally includes a conduit through which hydrogen is transferred to end users and a mating connector for coupling the conduit to the end users. The mating connector may be any adapter suitable for sealably connecting the conduit to the end user such that the end user is in gaseous communication with the hydrogen dispensing system. The hydrogen dispensing system may also include a manifold assembly having an input from the gaseous hydrogen storage system, an input from the metal hydride hydrogen compressor, and a output through which hydrogen enters the conduit. In addition to supplying hydrogen to an end user, the conduit and mating connector may also be configured to supply hydrogen to an onboard fuel cell or hydrogen powered generator. The hydrogen dispensing system may also include a second conduit with a mating connector for supplying compressed hydrogen to an onboard fuel cell or hydrogen powered generator.

Figure 3:
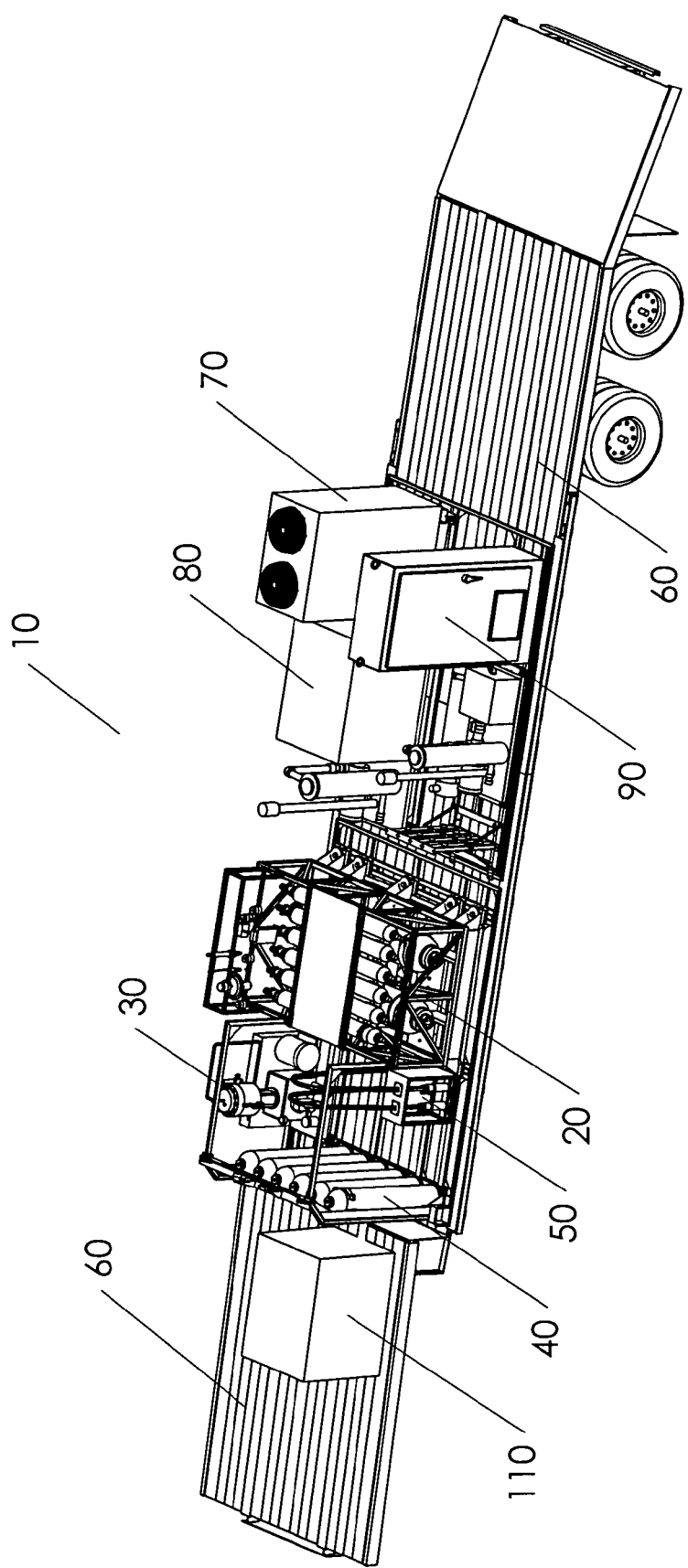
FIG. 3, is a depiction of another alternative embodiment of the mobile hydrogen delivery system including an electrical power source.

In an alternative embodiment of the present invention, as shown in FIG. 3, hydrogen may be supplied to the metal hydride hydrogen compressor from an onboard hydrogen generator 100. The hydrogen generator 100 may be selected from a hydrogen reformer, a chemical hydride reactor, an electrolyzer, or combinations thereof.

The hydrogen reformer may be any type of reforming system known in the art which produces hydrogen from one or hydrogen containing fuels via a reforming process. The hydrogen reformer is a device that extracts hydrogen from hydrogen containing fuels. Hydrogen containing fuels may include methanol, methane, and various other hydrocarbon or alcohol containing fuels. Reformers separate hydrogen and carbon from the fuel via a catalytic reaction which produces hydrogen gas, carbon monoxide, and/or carbon dioxide. Reformation reactions are a common type of oxidation reaction and involve the breaking of bonds between hydrogen and other atoms such as carbon, oxygen, or nitrogen. Hydrogen atoms released upon breaking of the bonds combine to form diatomic hydrogen molecules. The broken bonds on the fuel molecules recombine or reform to produce new molecules.

Production of hydrogen from hydrocarbon and oxygenated hydrocarbon compounds is frequently accomplished with a steam reformation process. In steam reformation processes, a hydrocarbon or oxygenated hydrocarbon (e.g. methanol) fuel is contacted with water in a high temperature reactor to produce hydrogen gas ($H_2$) along with carbon monoxide (CO) and/or carbon dioxide ($CO_2$). Representative hydrogen producing steam reformation reactions for a general hydrocarbon ($C_nH_m$) and a general alcohol ($C_pH_qOH$) are given below:

$$C_nH_m + xH_2O <-> (m/2+x)H_2 + yCO_2 + (n-y)CO$$
$$C_pH_qOH + rH_2O <-> (\tfrac{1}{2}(q+1)+r)H_2 + vCO_2 + (p-v)CO$$

The hydrocarbon $C_nH_m$ may be an alkane, alkene, or alkyne, and the group $C_pH_q$ on the general alcohol may be an alkyl, alkenyl, or alkynyl group. Similar reactions may be used to describe the production of hydrogen from other oxygenated hydrocarbons such as aldehydes, ketones, and ethers. The relative amounts of $CO_2$ and CO produced depend on the specific reactant molecule, the amount of water used, and the reaction conditions (e.g. pressure and temperature).

The chemical hydride reactor may be any type of vessel having an interior which accommodates a chemical reaction. The vessel, however, must not be reactive with any of the reactants or reaction products. Inside the vessel, a water reactive chemical hydride reacts with water to produce gaseous hydrogen. The hydrogen is then supplied from the chemical hydride reactor to the hydrogen compressor system. The chemical hydride reactor may utilize one or more chemical hydrides selected from alkali metal hydrides, alkali metal borohydrides, alkaline earth metal hydrides, and alkaline earth metal borohydrides. Examples of water reactive chemical hydrides that may be used in accordance with the present invention are sodium borohydride, potassium hydride, sodium hydride, lithium aluminum hydride, calcium nickel hydride, calcium lithium hydride, and combinations thereof.

The electrolyzer comprises one or more electrolytic cells that produce hydrogen and oxygen via the decomposition of water in an electrolyte environment. The major components of an electrolytic cell usually includes an anode and a cathode in contact with an electrolyte and a membrane used to separate the anode, the cathode, and the reaction products. During operation, a fixed current is applied across the anode and cathode while the anode and cathode are in contact with the electrolyte. Electrochemical reactions taking place at the anode and cathode form oxygen and hydrogen gas. The reactions and the overall reaction are represented as:

Cathode: $2H_2O + 2e^- -> H_2 + 2OH^-$

Anode: $2OH^- -> \tfrac{1}{2}O_2 + 2e^- + H_2O$

Overall: $H_2O -> H_2 + \tfrac{1}{2}O_2$

The particular materials used for the anode and the cathode are important since they provide the necessary catalysts for the reactions taking place at the anode and cathode. For example, the role the anode catalyst M is believed to play in evolving oxygen in an electrolytic cell is as follows:

$$M + OH^- \rightarrow MOH + e^-$$

$$MOH + OH^- \rightarrow MO + H_2O + e^-$$

$$2MO \rightarrow MO_2 + M$$

$$MO_2 \rightarrow O_2 + M$$

In addition to allowing the desired reactions to take place, the catalytic efficiency of the catalytic materials is a very important consideration since an effective catalytic material reduces the operating energy requirements of the cell. The applied voltage necessary to produce the anode and cathode reactions in an electrolytic cell is the sum of the decomposition voltage (thermodynamic potential) of the compounds in the electrolyte being electrolyzed, the voltage required to overcome the resistance of the electrolyte and the electrical connectors of the cell, and the voltage required to overcome the resistance to the passage of current at the surface of the anode and cathode (charge transfer resistance). The charge transfer resistance is referred to as the overvoltage. The overvoltage represents an undesirable energy loss which adds to the operating costs of the electrolytic cell.

Solar energy may be used by the electrolytic cell to produce hydrogen. Preferably, triple junction amorphous silicon solar cells are used to power the electrolyzer. Triple junction amorphous silicon solar cells are lightweight, durable, and have shown excellent performance in a wide variety of conditions.

In another alternative embodiment of the present invention as shown in FIG. 4, the mobile hydrogen delivery system may include a power generator 110 such as a fuel cell and/or a hydrogen powered generator in gaseous communication with the hydrogen dispensing system. The fuel cell and/or hydrogen powered generator provide a mobile source of electricity onboard the hydrogen delivery system. The hydrogen powered generator may be any hydrogen powered generator known in the art and the fuel cell may be selected from alkaline fuel cells, PEM fuel cells, molten carbonate fuel cells, phosphoric acid fuel cells, and solid oxide fuel cells.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

The invention claimed is:

1. A mobile hydrogen delivery system comprising:
   a metal hydride hydrogen compressor for storing hydrogen and providing a low pressure stream of hydrogen;
   a mechanical hydrogen compressor for receiving said low pressure stream of hydrogen and providing a high pressure stream of hydrogen at a pressure higher than the pressure of said low pressure stream of hydrogen;
   a gaseous hydrogen storage system including one or more pressure containment vessels for receiving and storing said high pressure stream of hydrogen;
   a hydrogen dispensing system for dispensing said low pressure stream of hydrogen from said metal hydride storage system and said high pressure stream of hydrogen from said gaseous hydrogen storage system; and
   a mobile platform for supporting said metal hydride storage system, said mechanical hydrogen compressor, said gaseous hydrogen storage system, and said hydrogen delivery system.

2. The mobile hydrogen delivery system according to claim 1, wherein said one or more pressure containment vessels comprise two or more pressure containment vessels, and said hydrogen dispensing system dispenses hydrogen from said two or more pressure containment vessels in a cascading manner.

3. The mobile hydrogen delivery system according to claim 1, wherein said metal hydride compressor is a single stage compressor.

4. The mobile hydrogen delivery system according to claim 1, wherein said metal hydride compressor is a multi-stage compressor.

5. The mobile hydrogen delivery system according to claim 1, wherein said low pressure stream of hydrogen has a pressure up to 2000 psig.

6. The mobile hydrogen delivery system according to claim 1, wherein said high pressure stream of hydrogen has a pressure up to 15000 psig.

7. The mobile hydrogen delivery system according to claim 1 further comprising a hydrogen generator for generating said hydrogen supply stream and supplying said hydrogen supply stream to said metal hydride hydrogen compressor.

8. The mobile hydrogen delivery system according to claim 7, wherein said hydrogen generator comprises one or more selected from a hydrogen reformer, a chemical hydride reactor, and an electrolyzer.

9. The mobile hydrogen delivery system according to claim 8, wherein said chemical hydride reactor reacts a water reactive chemical hydride with water to produce gaseous hydrogen.

10. The mobile hydrogen delivery system according to claim 9, wherein said water reactive chemical hydride is selected from alkali metal hydrides, alkali metal borohydrides, alkaline earth metal hydrides, alkaline earth metal borohydrides, and combinations thereof.

11. The mobile hydrogen delivery system according to claim 8, wherein said electrolyzer is powered by a solar generator.

12. The mobile hydrogen delivery system according to claim 11, wherein said solar generator comprises one or more triple junction amorphous silicon solar cells.

13. The mobile hydrogen delivery system according to claim 1 further comprising a fuel cell and/or a hydrogen powered generator in gaseous communication with said hydrogen dispensing system.

* * * * *